United States Patent [19]

Huseby et al.

[11] Patent Number: 4,547,471
[45] Date of Patent: Oct. 15, 1985

[54] HIGH THERMAL CONDUCTIVITY ALUMINUM NITRIDE CERAMIC BODY

[75] Inventors: Irvin C. Huseby, Schenectady; Carl F. Bobik, Burnt Hills, both of N.Y.

[73] Assignee: General Electric Company, Schenectady, N.Y.

[21] Appl. No.: 553,213

[22] Filed: Nov. 18, 1983

[51] Int. Cl.[4] .......................................... C04B 35/58
[52] U.S. Cl. ..................................... 501/98; 264/61; 264/65; 423/263; 423/412; 501/152; 501/153
[58] Field of Search ............... 423/263, 385, 409, 412; 501/96, 98, 152; 264/65

[56] References Cited

U.S. PATENT DOCUMENTS

| | | | |
|---|---|---|---|
| 3,108,887 | 10/1963 | Lenie et al. | 501/98 |
| 3,833,389 | 9/1974 | Komeya et al. | 501/96 |
| 3,930,875 | 1/1976 | Ochiai et al. | 501/98 |
| 4,097,293 | 6/1978 | Komeya et al. | 264/65 |
| 4,127,416 | 11/1978 | Lumby et al. | 501/98 |
| 4,143,107 | 3/1979 | Ishii et al. | 501/126 |
| 4,146,379 | 3/1979 | Copley | 264/65 |
| 4,478,785 | 10/1984 | Huseby et al. | 501/98 |

FOREIGN PATENT DOCUMENTS

| | | |
|---|---|---|
| 3313836 | 10/1984 | Fed. Rep. of Germany . |
| 2512012 | 3/1983 | France . |
| 49-19686 | 4/1974 | Japan . |
| 58-32072 | 2/1983 | Japan ..... 501/96 |
| 58-32073 | 2/1983 | Japan ..... 501/96 |
| 2132911 | 7/1984 | United Kingdom . |

OTHER PUBLICATIONS

Advanced Optical Ceramics, Phase III, Final Report, DIN:82SDR2006, Feb. 1982, pp. 4–76 to 4–80 and 4–127 to 4–137.
Slack, G. A., "Nonmetallic Crystals with High Thermal Conductivity", J. Phys. Chem. Solids, 1973, vol. 34, pp. 321–335.
Komeya et al., Trans. & J. Brit. Ceram. Soc., 70 (3), pp. 107–113 (1971), "The Influence of Fibrous Aluminum Nitride on the Strength of Sintered AlN-Y$_2$O$_3$".
Heraeus PS-B-80, 4 pages.
Komeya, K. et al., "Effects of Various Additives on Sintering of Aluminum Nitride", english translation of Yogyo-Kyokai-shi 89 (6), (1981), pp. 330–334.
Komeya, K. et al., "Science of Ceramics", vol. 6, 1973, pp. XX/3–XX13, Texture and Strength of Hot Pressed AlN-Y$_2$O$_3$".
Litvinenko V. F. et al., "Thermophysical Properties of Aluminum Nitride-Yttria Materials", translated from Poroshkovaya Metallurgiya, No. 6(246), pp. 77–79, Jun. 1983, pp. 490–492.
Schultz, K. A. et al., "Sintering of Aluminum Nitride with Low Oxide Addition", Progress in Nitrogen Ceramics (1983), pp. 245–252.

Primary Examiner—Helen M. McCarthy
Attorney, Agent, or Firm—Jane M. Binkowski; James C. Davis, Jr.; James Magee, Jr.

[57] ABSTRACT

Figure 1:
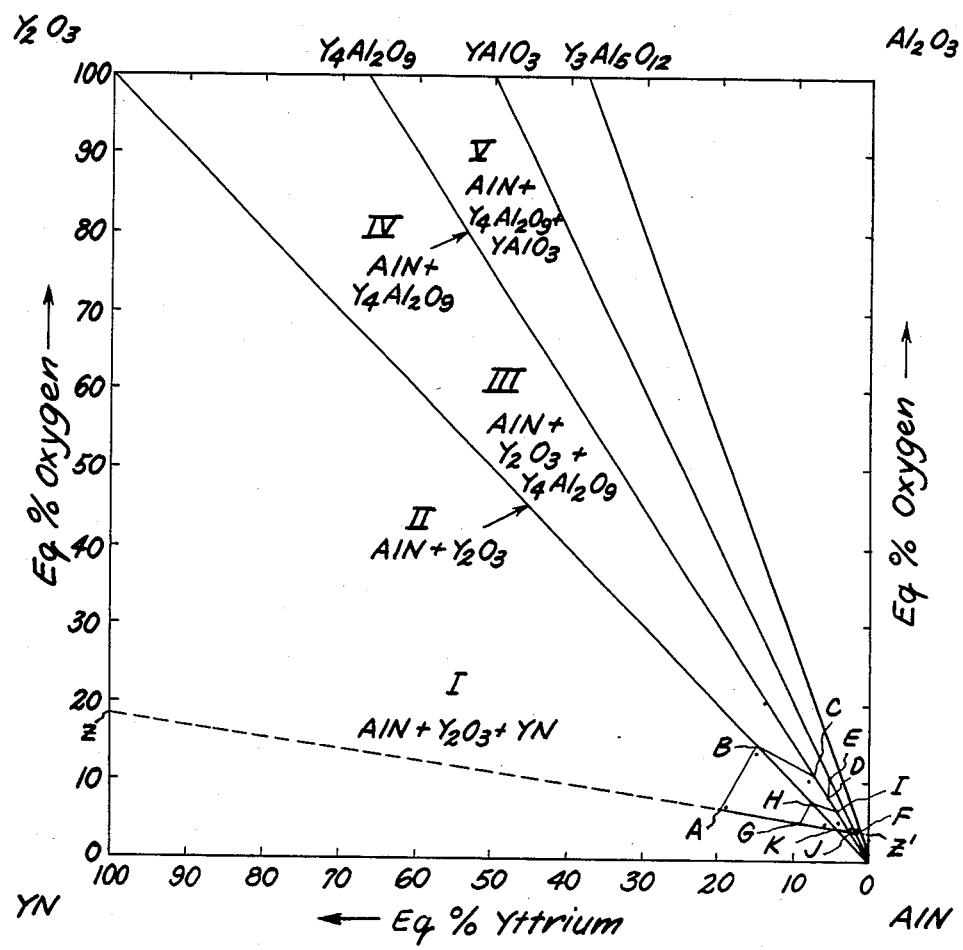

A process for producing a polycrystalline aluminum nitride ceramic body having a composition defined and encompassed by line ABCDEFA but not including lines CD and EF of FIG. 1, a porosity of less than about 10% by volume of said body and a thermal conductivity greater than 1.0 W/cm·K at 22° C. which comprises forming a mixture comprised of aluminum nitride powder and an yttrium additive selected from the group consisting of yttrium, yttrium hydride, yttrium nitride and mixtures thereof, said aluminum nitride and yttrium additive having a predetermined oxygen content, said mixture having a composition wherein the equivalent % of yttrium, aluminum, nitrogen and oxygen is defined and encompassed by line ABCDEFA but not including lines CD and EF in FIG. 1, shaping said mixture into a compact and sintering said compact at a temperature ranging from about 1850° C. to about 2170° C. in an atmosphere selected from the group consisting of nitrogen, argon, hydrogen and mixtures thereof to produce said polycrystalline body.

53 Claims, 2 Drawing Figures

HIGH THERMAL CONDUCTIVITY ALUMINUM NITRIDE CERAMIC BODY

The present invention relates to the production of a polycrystalline aluminum nitride body having a thermal conductivity higher than 1.0 W/cm·K at 22° C.

A suitably pure aluminum nitride single crystal, containing 300 ppm dissolved oxygen, has been measured to have a room temperature thermal conductivity of 2.8 W/cm·K, which is almost as high as that of BeO single crystal, which is 3.7 W/cm·K, and much higher than that of $\alpha$-Al$_2$O$_3$ single crystal, which is 0.44 W/cm·K. The thermal conductivity of an aluminum nitride single crystal is a strong function of dissolved oxygen and decreases with an increase in dissolved oxygen content. For example, the thermal conductivity of aluminum nitride single crystal having 0.8 wt % dissolved oxygen, is about 0.8 W/cm·K.

Current theory indicates that aluminum nitride has a strong affinity for oxygen. The introduction of oxygen into the aluminum nitride lattice in aluminum nitride powder results in the formation of Al vacancies via the equation:

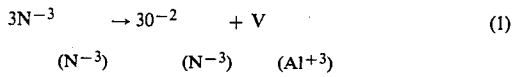

Thus, the insertion of 3 oxygen atoms on 3 nitrogen sites will form one vacancy on an aluminum site. The presence of oxygen atoms on nitrogen sites will probably have a negligible influence on the thermal conductivity of AlN. However, due to the large difference in mass between an aluminum atom and a vacancy, the presence of vacancies on aluminum sites has a strong influence on the thermal conductivity of AlN and, for all practical purposes, is probably responsible for all of the decrease in the thermal conductivity of AlN.

There are usually three different sources of oxygen in nominally pure AlN powder. Source #1 is discrete particles of Al$_2$O$_3$. Source #2 is an oxide coating, perhaps as Al$_2$O$_3$ coating the AlN powder particles. Source #3 is oxygen in solution in the AlN lattice. The amount of oxygen present in the AlN lattice in AlN powder will depend on the method of preparing the AlN powder. Additional oxygen can be introduced into the AlN lattice by heating the AlN powder at elevated temperatures. Measurements indicate that at $\sim$1900° C. the AlN lattice can dissolve $\sim$1.2 wt % oxygen.

In the present invention, an yttrium additive is added to AlN powder to deoxidize the AlN and produce a polycrystalline AlN body with a significantly improved thermal conductivity. Specifically, the yttrium additive introduces yttrium which reacts with oxygen present in AlN tying up such oxygen by forming a second phase or phases that contain yttrium and oxygen and thus reducing the oxygen content of the AlN crystal grains. In the present composition, there is sufficient yttrium- and oxygen-containing liquid phase formed at sintering temperature to carry out the present liquid phase sintering and produce the present product.

Figure 2:
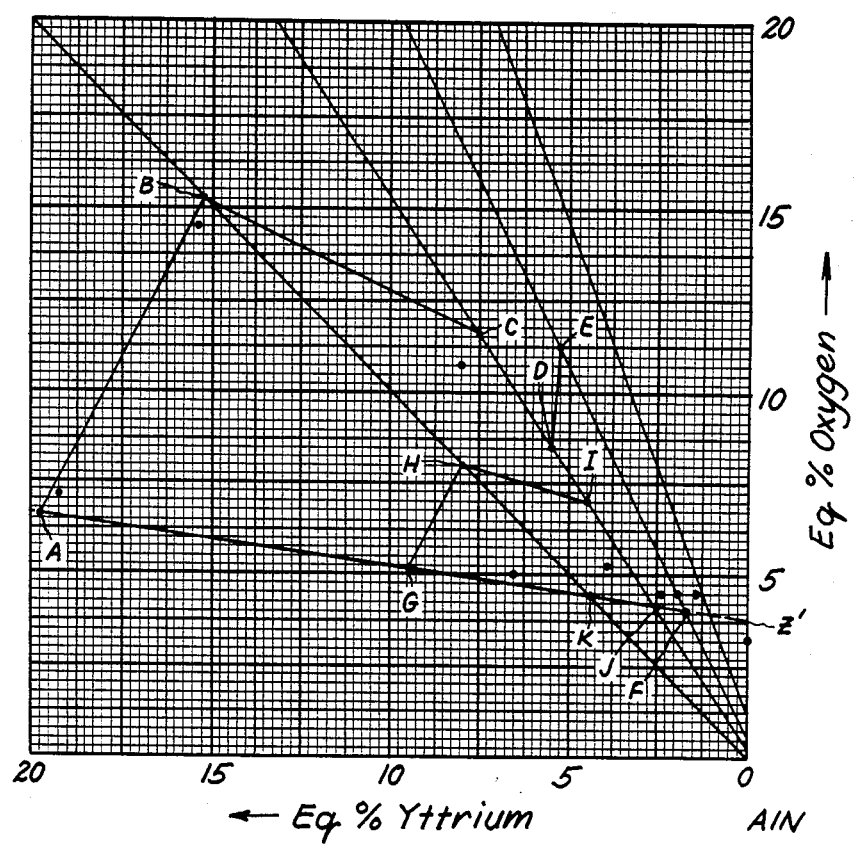

Those skilled in the art will gain a further and better understanding of the present invention from the detailed description set forth below, considered in conjunction with the figures accompanying and forming a part of the specification in which:

FIG. 1 is a composition diagram showing the subsolidus phase equilibria in the reciprocal ternary system comprised of AlN, YN, Y$_2$O$_3$ and Al$_2$O$_3$. FIG. 1 is plotted in equivalent % and along each axis of ordinates the equivalent % of oxygen is shown (the equivalent % of nitrogen is 100% minus the equivalent % of oxygen). Along the axis of abscisses, the equivalent % of yttrium is shown (the equivalent % of aluminum is minus the equivalent % of yttrium). In FIG. 1, line ABCDEFA but not lines CD and EF encompasses and defines the composition of the present sintered body, and line GHIJC but not line IJ encompasses and defines the preferred composition of the present sintered body. FIG. 1 also shows an ordinates-joining straight line ZZ' joining the oxygen contents of an YN additive and an aluminum nitride powder. From the given equivalent % of yttrium and Al at any point on an ordinates-joining line passing through the present composition, the required amounts of yttrium additive and AlN for producing the present composition can be calculated; and FIG. 2 is an enlarged view of the section of FIG. 1 showing the composition of the present polycrystalline body.

Briefly stated, the present process for producing a polycrystalline aluminum nitride ceramic body having a composition defined and encompassed by line ABCDEFA but not including lines CD and EF of FIG. 1, a porosity of less than about 10% by volume of said body and a thermal conductivity greater than 1.0 W/cm·K at 22° C. comprises forming a mixture comprised of aluminum nitride powder and an yttrium additive selected from the group consisting of yttrium, yttrium hydride, yttrium nitride and mixtures thereof, said aluminum nitride and yttrium additive having a predetermined oxygen content, shaping said mixture into a compact, said mixture and/or said compact having a composition wherein the equivalent % of yttrium, aluminum, nitrogen and oxygen is defined and encompassed by line ABCDEFA but not including lines CD and EF in FIG. 1, and sintering said compact at a temperature ranging from about 1850° C. to about 2170° C. in an atmosphere selected from the group consisting of nitrogen, argon, hydrogen and mixtures thereof to produce said polycrystalline body.

In the present invention, oxygen content is determinable by neutron activation analysis.

Briefly stated, in a preferred embodiment, the present process for producing a polycrystalline aluminum nitride ceramic body a composition defined and encompassed by line GHIJG not including line IJ of FIG. 1, a porosity of less than about 10% by volume of said body and a thermal conductivity greater than 1.5 W/cm·K at 22° C. comprises forming a particulate mixture comprised of aluminum nitride powder and an yttrium additive selected from the group consisting of yttrium, yttrium hydride, yttrium nitride and mixtures thereof, said aluminum nitride and yttrium additive having a predetermined oxygen content, shaping said mixture into a compact, said mixture and/or said compact having a composition wherein the equivalent % of yttrium, aluminum and oxygen is defined and encompassed by line GHIJG but not including line IJ in FIG. 1, and sintering said compact at a temperature ranging from about 1860° C. to about 2170° C. in an atmosphere selected from the group consisting of nitrogen, argon, hydrogen and mixtures thereof to produce said polycrystalline body.

Briefly stated, in another embodiment, the present process for producing a polycrystalline ceramic body having a composition comprised of from greater than about 1.6 equivalent % yttrium to about 19.75 equivalent % yttrium, from about 80.25 equivalent % of aluminum up to about 98.4 equivalent % aluminum, from greater than about 4.0 equivalent % oxygen to about 15.25 equivalent % oxygen and from about 84.75 equivalent % nitrogen up to about 96.0 equivalent % nitrogen, a porosity of less than about 10% by volume of said body and a thermal conductivity greater than 1.0 W/cm·K at 22° C. which comprises forming a particulate mixture comprised of aluminum nitride powder and an yttrium additive selected from the group consisting of yttrium, yttrium hydride, yttrium nitride and mixtures thereof, said aluminum nitride and yttrium additive having a predetermined oxygen content, shaping said mixture into a compact, said mixture and/or said compact having a composition comprised of an equivalent % of yttrium, aluminum, oxygen and nitrogen which is the same as or which does not differ significantly from that of said polycrystalline body, and sintering said compact at a temperature ranging from about 1850° C. to about 2170° C. in an atmosphere selected from the group consisting of nitrogen, argon, hydrogen and mixtures thereof to produce said polycrystalline body.

Briefly stated, in another preferred embodiment, the present process for producing a polycrystalline ceramic body having a composition comprised of from greater than about 2.5 equivalent % yttrium to about 9.5 equivalent % yttrium, from about 90.5 equivalent % aluminum up to about 97.5 equivalent % yttrium, from greater than about 4.1 equivalent % oxygen to about 8.0 equivalent % oxygen and from about 92.0 equivalent % nitrogen up to about 95.9 equivalent % nitrogen, a porosity of less than about 5% by volume of said body and a thermal conductivity greater than 1.5 W/cm·K at 22° C. which comprises forming a particulate mixture comprised of aluminum nitride powder and an yttrium additive selected from the group consisting of yttrium, yttrium hydride, yttrium nitride and mixtures thereof, said aluminum nitride and yttrium additive having a predetermined oxygen content, shaping said mixture into a compact, said mixture and/or said compact having a composition comprised of an equivalent % of yttrium, aluminum, oxygen and nitrogen which is the same as or which does not differ significantly from that of said polycrystalline body, and sintering said compact at a temperature ranging from about 1860° C. to about 2170° C. in an atmosphere selected from the group consisting of nitrogen, argon, hydrogen and mixtures thereof to produce said polycrystalline body.

Preferably, the present polycrystalline aluminum nitride body has a composition defined and encompassed by line GHIJG but not line IJ of FIG. 1, a porosity of less than about 10% by volume, preferably less than about 5% by volume, and more preferably less than about 2% by volume of the total volume of said body and a thermal conductivity greater than 1.5 W/cm·K at 22° C.

Preferably, in another embodiment, the present polycrystalline body has a composition comprised of from greater than about 2.5 equivalent % yttrium to about 9.5 equivalent % yttrium, from about 90.5 equivalent % aluminum up to about 97.5 equivalent % aluminum, from greater than about 4.1 equivalent % oxygen to about 8.0 equivalent % oxygen and from about 92.0 equivalent % nitrogen up to about 95.9 equivalent % nitrogen, said polycrystalline body having a porosity of less than about 10% by volume, preferably less than about 5% by volume, and more preferably less than about 2% by volume of the total volume of said body and a thermal conductivity greater than about 1.5 W/cm·K @22° C.

FIGS. 1 and 2 were developed algebraically on the basis of data produced by forming a particulate mixture of YN of predetermined oxygen content and AlN powder of predetermined oxygen content under nitrogen gas, shaping the mixture into a compact under nitrogen gas and sintering the compact for time periods ranging from 1 to 1.5 hours at sintering temperatures ranging from about 1860° C. to about 2050° C. in nitrogen gas at ambient pressure. More specifically, the entire procedure ranging from mixing of the YN and AlN powders to sintering the compact formed therefrom was carried out in a nonoxidizing atmosphere of nitrogen.

The best method to plot phase equilibria that involve oxynitrides and two different metal atoms, where the metal atoms do not change valence, is to plot the compositions as a reciprocal ternary system as is done in FIG. 1. In the particular system of FIG. 1 there are two types of non-metal atoms (oxygen and nitrogen) and two types of metal atoms (yttrium and aluminum). The Al, Y, oxygen and nitrogen are assumed to have a valence of +3, +3, −2, and −3, respectively. All of the Al, Y, oxygen and nitrogen are assumed to be present as oxides, nitrides or oxynitrides, and to act as if they have the aforementioned valences.

The phase diagram of FIG. 1 is plotted in equivalent percent. The number of equivalents of each of these elements is equal to the number of moles of the particular element multiplied by its valence. Along the ordinate is plotted the number of oxygen equivalents multiplied by 100% and divided by the sum of the oxygen equivalents and the nitrogen equivalents. Along the abscissa is plotted the number of yttrium equivalents multiplied by 100% and divided by the sum of the yttrium equivalents and the aluminum equivalents. All compositions of FIG. 1 are plotted in this manner.

Compositions on this diagram can also be used to determine the weight percent and the volume percent of the various phases, i.e., a particular point on the present composition in FIG. 1 can be used to determine the phase composition of the present polycrystalline body.

FIG. 1 shows the composition and the phase equilibria of the polycrystalline body in the solid state Regions I, II, III, IV, and V.

In FIG. 1, the composition of the present polycrystalline body is encompassed and defined by line ABCDEFA but does not include lines CD and EF. The preferred composition of the present polycrystalline body is encompassed and defined by line GHIJG but not line IJ.

More specifically, in FIG. 1 the area encompassed and defined by line ABKA but not including line BK falls within Region I and it a polycrystalline body having a phase composition comprised of AlN, $Y_2O_3$ and YN.

The area defined by line BK is in Region II and this is a polycrystalline body with a phase composition comprised of AlN and $Y_2O_3$.

The area defined and encompassed by line BCJKB but not including lines BK and CJ falls within Region III, and this area is a polycrystalline body with a phase composition comprised of AlN, $Y_2O_3$ and $Y_4Al_2O_9$.

The area defined by line DJ is in Region IV and it is a polycrystalline body comprised of AlN and $Y_4Al_2O_9$.

The area encompassed and defined by line DEFJD but not including lines EF and DJ falls within Region V and it is a polycrystalline body comprised of AlN, $Y_4Al_2O_9$ and $YAlO_3$.

The calculated compositions of particular points in FIG. 1 on the lines ABCDEFGHIJK are shown in Table I as follows:

TABLE I

| Point | Composition (Equivalent %) | | Vol % and (Wt %) of Phases* | | | | |
|---|---|---|---|---|---|---|---|
| | Y | Oxygen | AlN | YN | $Y_2O_3$ | $Y_4Al_2O_9$ | $YAlO_3$ |
| A | 19.75 | 6.6 | 72.7 (61.1) | 16.6 (25.1) | 10.7 (13.8) | — | — |
| B | 15.25 | 15.25 | 75.7 (66.9) | — | 24.3 (33.1) | — | — |
| C | 7.5 | 11.6 | 82.9 (77.8) | — | — | 17.1 (22.2) | — |
| D | 5.5 | 8.5 | 87.3 (83.2) | — | — | 12.7 (16.8) | — |
| E | 5.25 | 11.25 | 86.5 (81.0) | — | — | — | 13.6 (19.0) |
| F | 1.6 | 4.0 | 95.8 (93.8) | — | — | — | 4.2 (6.2) |
| G | 9.5 | 5.1 | 85.6 (78.3) | 5.8 (9.6) | 8.6 (12.2) | — | — |
| H | 8.0 | 8.0 | 86.6 (80.7) | — | 13.4 (19.3) | — | — |
| I | 4.5 | 7.0 | 89.5 (86.0) | — | — | 10.5 (14.0) | — |
| J | 2.5 | 4.1 | 94.0 (91.9) | — | — | 6.0 (8.1) | — |
| K | 4.4 | 4.4 | 92.4 (88.7) | — | 7.6 (11.3) | — | — |

*Wt % is given in parentheses, vol % is given without parentheses

As can be seen from Table I, the polycrystalline body of point A composition would have the largest amount of second phase present whereas the polycrystalline body of point F would have the minimum amount of second phase present.

In the present process, the aluminum nitride powder can be of commercial or technical grade. Specifically, it should not contain any impurities which would have a significantly deleterious effect on the desired properties of the resulting sintered product, and preferably, the aluminum nitride is at least about 99% pure excluding oxygen. Typically, commercially available aluminum nitride contains from about 1.5 weight % (2.6 equivalent %) to about 3 weight % (5.2 equivalent %) of oxygen.

The oxygen content of aluminum nitride is determinable by neutron activation analysis.

Generally, the present aluminum nitride powder has a specific surface area ranging from about 13.1 $m^2/g$ to about 2.6 $m^2/g$, and preferably from about 9.2 $m^2/g$ to about 3.7 $m^2/g$ according to BET surface area measurement. As defined through its specific surface area, it has an average equivalent spherical particle size ranging from about 0.14 micron to about 0.70 micron, and preferably from about 0.20 micron to about 0.50 micron.

By weight % or % by weight of a component herein, it is meant that the total weight % of all the components is 100%.

The present yttrium additive is selected from the group consisting of yttrium, yttrium hydride, yttrium nitride and mixtures thereof. Preferably, the present yttrium additive is yttrium metal.

The present yttrium additive introduces yttrium which reacts with the oxygen present in the present composition forming a sufficient amount of liquid phase to carry out the present liquid phase sintering to produce the present sintered body.

Generally, the present yttrium additive has a specific surface area which depends largely on the particular yttrium additive used as well as the particular processing technique for producing the present sintered body. Preferably, if yttrium is introduced as YN or $YH_3$, the additive has a specific surface area greater than about 0.3 $m^2/g$. Also, preferably, if yttrium is introduced as Y metal, the additive has a specific surface area greater than 0.15 $m^2/g$.

In carrying out the present process, in one embodiment, the yttrium additive of predetermined oxygen content is admixed with the AlN powder of predetermined oxygen content to form a particulate mixture having a composition wherein the equivalent % of yttrium, aluminum nitrogen and oxygen is defined and encompassed by line ABCDEFA but not including line EF of FIG. 1. Specifically, in carrying out the present process, the oxygen content of the yttrium additive and that of the aluminum nitride is determined. Using yttrium nitride as an example of the additive, knowing such oxygen content, the equivalent % of oxygen in the yttrium nitride and AlN is calculated. A straight line is then drawn across FIG. 1, as shown by broken line ZZ' joining the equivalent % of oxygen in yttrium nitride with that in AlN. For any point on this straight line (ZZ') passing through the present composition, the equivalent % of Y is given along the abscissa. 100% minus the equivalent % of Y is the equivalent % of Al. From the given equivalent % of yttrium and Al, the required amounts of yttrium nitride and AlN powder for producing the present polycrystalline body are calculated.

Examples of calculations for equivalent % are as follows:

For an AlN powder measured as having 2.2 weight % oxygen, it is assumed that all of the oxygen is bound to AlN as $Al_2O_3$, and that the measured 2.2 weight % of oxygen is present as 4.67 weight % $Al_2O_3$.

For a YN powder measured as having 4.2 weight % oxygen, it is assumed that all of the oxygen is bound to Y as $Y_2O_3$, and that the measured 4.2 weight % of oxygen is present as 19.76 weight % $Y_2O_3$.

Using these values, 10 grams of this AlN powder and 2 grams of this YN powder is seen as equivalent to the following:

| | Wt (g) | Moles | Equivalents |
|---|---|---|---|
| AlN | 9.533 | $2.3258 \times 10^{-1}$ | .69774 |
| $Al_2O_3$ | .467 | $4.580 \times 10^{-3}$ | $2.748 \times 10^{-2}$ |
| YN | 1.6048 | $1.5594 \times 10^{-2}$ | $4.678 \times 10^{-2}$ |
| $Y_2O_3$ | .3952 | $1.7501 \times 10^{-3}$ | $1.050 \times 10^{-2}$ |

TOTAL EQUIVALENTS = 0.7825

V = Valence $$M = Moles = \frac{Wt\ (g)}{MW}$$

MW = molecular weight
Eq = Equivalents
Eq = M × V $$\text{Valences:} \quad \begin{aligned} &\text{Al} + 3 \\ &\text{Y} + 3 \\ &\text{N} - 3 \\ &\text{O} - 2 \end{aligned} \tag{2}$$

$$\text{Eq \% Oxygen in mixture} = \frac{\text{no. oxygen equivalents}}{\text{no. oxygen equivalents + no. nitrogen equivalents}}$$

$$= \frac{2.748 \times 10^{-2} + 1.050 \times 10^{-2}}{0.7825} = 4.85\% \tag{3}$$

$$\tag{4}$$

$$\text{Eq \% Oxygen in AlN} = \frac{\text{no. oxygen equivalents}}{\text{no. oxygen equivalents + no. nitrogen equivalents}}$$

$$= \frac{2.748 \times 10^{-2}}{.72522} = 3.79\% \tag{5}$$

$$\tag{6}$$

$$\text{Eq \% Oxygen in YN} = \frac{\text{no. oxygen equivalents}}{\text{no. oxygen equivalents + no. nitrogen equivalents}}$$

$$= \frac{1.05 \times 10^{-2}}{5.728 \times 10^{-2}} = 18.33\% \tag{7}$$

Thus, knowing the equivalent % of oxygen present in the AlN powder and the equivalent % oxygen present in the YN powder, a straight line, which in this instance is line ZZ' in FIG. 1, is drawn across FIG. 1 and that portion of line ZZ' passing through the present composition comprises compositions composed of an equivalent % of Y, O, Al and N, i.e. compositions of AlN and YN, useful in the present process.

$$\text{Eq \% Y in mixture} = \frac{\text{no. Y equivalents}}{\text{no. Y equivalents + no. Al equivalents}} \tag{8}$$

$$\frac{4.678 \times 10^{-2} + 1.050 \times 10^{-2}}{0.7825} = 7.32\% \tag{9}$$

From the equivalent % of oxygen and Y present in the mixture, it can be seen that this composition falls on line ZZ' passing through the present composition in FIG. 1.

To produce the present composition containing 5.50 equivalent % O and 4.50 equivalent % Y using an AlN powder measured as having 2.2 weight % O (4.67 weight % Al$_2$O$_3$) and a YN powder measured as having 4.2 weight % oxygen (19.76 weight % Y$_2$O$_3$), the following calculations for weight % from equivalent % can be made:

```
            x = Wt AlN powder
            y = Wt YN powder
    100 - x - y = Wt Y₂O₃ powder
    Thus: AlN  = 0.9533x
          Al₂O₃ = .0467x
          YN   = 0.8024y
          Y₂O₃ = .1976Y + 100 - x - y = 100 - x - .8024y
```

| | Weight (g) | Moles | Equivalents |
|---|---|---|---|
| AlN | .9533x | $2.3258 \times 10^{-2}x$ | $6.9774 \times 10^{-2}x$ |
| Al$_2$O$_3$ | .0467x | $4.580 \times 10^{-4}x$ | $2.7481 \times 10^{-3}x$ |
| YN | .8024y | $7.7969 \times 10^{-3}y$ | $2.3391 \times 10^{-2}y$ |
| Y$_2$O$_3$ | 100 − x − .8024y | $\frac{100 - x - .8024y}{225.81}$ | $(100 - x - .8024y)2.657 \times 10^{-2}$ |

T = Total Equivalents = 

$$\text{Eq \% Y} = .045 = \frac{4.595 \times 10^{-2}x + 2.071 \times 10^{-3}y + 2.657}{} \tag{10}$$

$$\frac{2.339 \times 10^{-2}y + (100 - x - .802y) 2.657 \times 10^{-2}}{T}$$

$$\text{Eq \% Oxyg} = .055 = \tag{11}$$

$$\frac{2.748 \times 10^{-3}x + (100 - x - .802y) 2.657 \times 10^{-2}}{T}$$

Solving Eqs (10) and (11) for x and y: x = 89.12
y = 7.45

| Powder | Weight (g) |
|---|---|
| AlN | x = 89.12 |
| YN | y = 7.45 |
| Y$_2$O$_3$ | 100 − x − y = 3.43 |

In this instance, it can be seen that 3.43 grams of Y$_2$O$_3$ were needed to be added to produce the desired present composition containing 4.50 equivalent % Y and 5.50 equivalent % O.

FIG. 1 was developed using YN as the present Y additive. Therefore, when Y metal is used as the additive, it is treated as if all of the Y metal nitrides to form YN according to the following equation:

$$Y + \tfrac{1}{2}N_2 \rightarrow YN \tag{12}$$

For example, 10.000 grams of Y metal of predetermined oxygen content will form 11.575 grams of YN of the same predetermined oxygen content. The equivalent % of oxygen present in 11.575 grams of YN is calculated. A straight line is then drawn across FIG. 1 connecting the equivalent % of oxygen for the calculated amount of YN and the equivalent % of oxygen in AlN. For any point on this straight line passing through the present composition, the equivalent % of yttrium is given on the abscissa. 100% minus the equivalent % of Y is the equivalent % of Al. From the equivalent % of yttrium and Al thus obtained, the required amounts of yttrium metal and AlN powder are calculated for producing the particulate mixture for producing the present polycrystalline body. However, experimentally, it has been found that these calculations for the amount of yttrium metal, i.e. the calculated amount of Y metal, produce a sintered body containing an equivalent % of Y which is approximately 10% higher than that calculated.

When YH$_3$ is used as the present additive, it is treated as if all the YH$_3$ decomposes to form Y (with by-product hydrogen gas vaporizing away), which then nitrides to form YN according to the following equations:

$$YH_3 \rightarrow Y + 3/2\, H_2 \tag{13}$$

$$Y + \tfrac{1}{2}N_2 \rightarrow YN \tag{14}$$

According to equations (13) and (14), 10 grams of YH$_3$ decomposes to form 9.671 grams Y which nitrides to form 11.195 grams YN. In the present invention, 10 grams of YH$_3$ of predetermined oxygen content is treated as being 11.195 grams of YN of the same predetermined oxygen content. The equivalent % of oxygen present in the 11.195 grams of YN is calculated. A straight line is then drawn across FIG. 1 connecting the equivalent % of oxygen in the AlN powder with the equivalent % of oxygen in the calculated amount of YN. For any point on this straight line passing through the present composition, the equivalent % of Y is given on the abscissa. 100% minus the equivalent % of Y is the equivalent % of Al. From the equivalent % of Y and Al thus obtained, the required amounts of $YH_3$ and AlN powder are calculated for producing the present polycrystalline body, i.e. for producing the particulate mixture resulting in the present polycrystalline body. However, experimentally, it has been found that these calculations for the amount of $YH_3$, i.e. the calculated amount of $YH_3$, produce a sintered body containing an equivalent % of Y which is approximately 10% higher than that calculated.

The yttrium additive in the form of a powder can be admixed with the aluminum nitride powder by a number of conventional techniques such as, for example, ball milling in a liquid dispersion.

If mixing, drying and forming the compact of the yttrium additive and AlN powder is carried out under a nonoxidizing atmosphere such as, for example, nitrogen, the resulting mixture or compact formed therefrom will contain an equivalent % of Y, Al, N and O which will not differ significantly from that of the resulting sintered body.

If mixing, drying and forming the compact of the yttrium additive and AlN powder is carried out in air, some oxygen is likely to be picked up and the resulting mixture typically contains oxygen in an amount higher than that of the total predetermined oxygen content of yttrium additive and AlN powder. The particular amount of oxygen picked up from the air depends largely on the particular yttrium additive used, particle size of the powders being mixed, and the particular mixing and/or drying procedure used to form the mixture. For example, yttrium metal forms a thin protective oxide film which usually limits oxygen pickup the extent of which is determinable largely by particle size, i.e. the finer the particle size, the greater is oxygen pickup from the air. On the other hand, yttrium hydride is hygroscopic and will pick up more oxygen than yttrium metal. Ordinarily, oxygen pickup by yttrium nitride is higher than that of yttrium metal but less than that of yttrium hydride. The amount of oxygen picked up from the air in a particular processing technique is determinable empirically by, for example, carrying out a run to produce the sintered polycrystalline body, determining the oxygen content of the sintered body, and comparing such oxygen content to that of the starting particulate mixture.

Ordinarily, AlN powder will not pick up sufficient oxygen from the air to prevent it from forming the sintered body of the present composition. Also, ordinarily the present yttrium additive composed of yttrium, YN and mixtures thereof will not pick up sufficient oxygen from the air to prevent it from forming the present sintered body. However, $YH_3$ is highly hygroscopic and may, on prolonged exposure to humid air, oxidize to the point which would prevent it from forming the present sintered body.

In another embodiment of the present invention, if desired, the present Y additive and/or AlN powders can be oxidized to produce a particulate mixture of the present composition. For example, any composition defined and encompassed by line ABCDEFA but not including lines CD and EF above the line AF can produced by increasing the oxygen content of a composition on line AF. This can be done, for example, by oxidizing YN, or the AlN powder, or by oxidizing a mixture of the YN and AlN powders. It also can be done by adding $Y_2O_3$ or $Al_2O_3$ powder, or a mixture thereof.

A number of techniques can be used to shape or press the particulate mixture into a compact. For example, it can be extruded, injection molded, die-pressed, isostatically pressed, slip cast or tape cast to produce the compact of desired shape. Any lubricants, binders or similar materials used to aid shaping of the mixture should have no significant deteriorating effect on the compact or the present resulting sintered body. Such shaping-aid materials are preferably of the type which evaporate on heating at relatively low temperatures, preferably below 200° C., leaving no significant residue. Preferably, the compact has a porosity of less than 60% and more preferably less than 50% to promote densification during sintering.

The present compact is densified, i.e., liquid-phase sintered, at a temperature ranging from about 1850° C. to about 2170° C., and preferably from about 1860° C. to about 2120° C., to produce the present polycrystalline body. To carry out the present liquid phase sintering, the compact, i.e., the present composition, contains sufficient equivalent percent of Y and O to form a sufficient amount of liquid phase at sintering temperature to densify the compact to produce the present sintered body. The particular densification, i.e., sintering, temperature is determinable empirically and depends on the composition of the compact. Specifically, for a sintering temperature to be operable in the present invention, it must generate sufficient liquid phase in the particular composition, i.e., in the present particular composition, to carry out the present liquid phase sintering to produce the present product. The lower the present sintering temperature, the smaller is the amount of liquid phase generated, i.e., densification becomes more difficult with decreasing sintering temperature.

In each region of the present composition shown in FIG. 1, the minimum densification temperature decreases by a small amount with increasing equivalent percent of Y and/or O. The sintering temperature should have no significantly deleterious effect in the present invention. For some larger-sized compacts of certain compositions, higher sintering temperatures may generate an excessively large amount of liquid phase which may warp the compact and produce shrinkage voids. Also what may be a deleteriously large amount of liquid phase for a larger-sized compact, may have no effect on a smaller-sized compact of the same composition.

For a compact of the present compositon falling in Region I of FIG. 1, i.e. the area of line ABKA but not line BK, the densification, i.e. sintering, temperature rangs from about 1940° C. to about 2170° C., and preferably from about 1940° C. to about 2050° C. In Region I the particular sintering temperature is determinable empirically and depends on the specific composition being sintered. For example, in the preferred portion of Region I, i.e. the area defined and encompassed by line GHKG but not including line HK, the sintering temperature rang from about 1970° C. to about 2050° C. since in this preferred portion of Region I, insufficient liquid phase is generated below about 1970° C. to produce the present sintered body. Also, in this preferred portion of Region I, the sintering temperature preferably ranges from about 1970° C. to about 2030° C. to produce the preferred sintered body having a thermal conductivity greater than 1.5 W/cm·K at 22° C. However, since there is more liquid phase generated by the present composition fall Region I in the area defined and encompassed by line ABHGA not including line BHG, the sintering temperature for such area composition ranges from about 1940° C. to about 2170° C.

For a compact of the present composition falling in Region II, i.e. line BK, the sintering temperature ranges from about 1940° C. to about 2150° C. and preferably from about 1940° C. to about 2020° C. A temperature lower than about 1940° C. may not generate sufficient liquid phase to produce the present sintered body and a temperature higher than about 2150° C. provides no significant advantage.

For a compact of the present composition falling in Region III, i.e. the area of line BCJKB but not including lines BK and CJ, the sintering temperature ranges from about 1860° C. to about 2080° C. A temperature lower than about 1860° C. may not produce sufficient liquid phase to produce the present sintered body and a temperature higher than about 2080° C. provides no significant advantage. The present Region III composition generates liquid phase at a temperature lower than the present Region I composition. Preferably, for the present compact of Region III composition containing from about 7.5 equivalent % to about 10 equivalent % oxygen, the maximum sintering temperature is about 2040° C., and for the present compact of Region III composition containing more than about 10 equivalent % oxygen, the maximum sintering temperature preferably is about 2010° C. to avoid formation of too much liquid phase.

For a compact of the present composition falling in Region IV, i.e. line DJ, the sintering temperature ranges from about 1850° C. to about 2070° C. A temperature lower than about 1850° C. may not produce sufficient liquid phase to produce the present product. On the other hand, a temperature higher than about 2070° C. provides no significant advantage.

For a compact of the present composition falling in Region V, i.e. the area of line DEFJD not lines DJ and EF, the sintering temperature ranges from about 1850° C. to about 2050° C. In Region V, a temperature lower than about 1850° C. is not likely to produce the present sintered body. Also, a temperature higher than about 2050° C. provides no significant advantage.

The present compact is sintered at ambient pressure in a gaseous atmosphere selected from the group consisting of argon, hydrogen, nitrogen and mixtures thereof. Preferably, the sintering atmosphere is nitrogen.

Preferably, the present compact is packed in powder mixture having the same composition as the compact before sintering to retard weight loss during sintering at about 1950° C. and higher.

Sintering time is determinable empirically. Typically, sintering time ranges from about 60 minutes to about 90 minutes.

The present sintered polycrystalline body is a pressureless sintered ceramic body. By pressureless sintering herein it is meant the densification or consolidation of the compact or shaped body at ambient pressure, i.e. without the application of mechanical pressure, into a ceramic body having a porosity of less than about 10% by volume.

The polycrystalline body of the present invention has the appearance of having been liquid-phase sintered. Substantially all of the AlN grains are rounded or substantially rounded and have a smooth surface, i.e. they have the appearance of a liquid-phase sintered ceramic.

Generally, the AlN phase has an average grain size ranging from about 1 micron to about 20 microns. An intergranular second phase is present along some of the AlN grain boundaries. The morphology of the microstructure indicates that this intergranular second phase was a liquid at sintering temperature.

The present sintered body has a porosity of less than about 10% by volume of the sintered body. Preferably, the present sintered body has a porosity of less than about 5% and most preferably less than about 2% by volume of the sintered body. The pores in the sintered body are fine sized, and generally they are less than about 1 micron in diameter. Porosity can be determined by standard metallographic procedures.

The present polycrystalline body has a thermal conductivity greater than 1.0 W/cm·K at 22° C., and preferably, greater than 1.5 W/cm·K at 22° C.

The present polycrystalline body has an electrical resistivity at 100 volts DC greater than $5 \times 10^{10} \Omega CM$ @ 22° C. Also, at 1000 volts DC it has an electrical resistivity greater than $5 \times 10^{10} \Omega CM$ @ 22° C.

The present polycrystalline has a composition defined and encompassed by line ABCDEFA but not including lines CD and EF of FIG. 1, a porosity of less than about 10% by volume, preferably less than about 5% by volume, and most preferably less than about 2% by volume of the total volume of said body and a thermal conductivity greater than 1.0 W/cm·K at 22° C.

In one embodiment, the present polycrystalline body has a composition comprised of from greater than about 1.6 equivalent % yttrium to about 19.75 equivalent % yttrium, from about 80.25 equivalent % aluminum up to about 98.4 equivalent % aluminum, from greater than about 4.0 equivalent % oxygen to about 15.25 equivalent % oxygen and from about 84.75 equivalent % nitrogen up to about 96 equivalent % nitrogen, said polycrystalline body having a porosity of less than about 10% by volume of said body and a thermal conductivity greater than 1.0 W/cm·K at 22° C.

In another embodiment, the present polycrystalline body is comprised of an AlN phase and a second phase ranging from about 4.2% by volume to about 27.3% by volume of the total volume of the sintered body. The second phase in the present sintered body contains yttrium and oxygen.

In a preferred embodiment, the present polycrystalline body has a composition defined and encompassed by line GHIJG but out not line IJ of FIG. 1, a porosity of less than about 10% by volume, preferably less than about 5% by volume, and most preferably less than about 2% by volume of the total volume of said body and a thermal conductivity greater than 1.5 W/cm·K at 22° C.

Also, in a preferred embodiment, the present polycrystalline body has a composition comprised of from greater than about 2.5 equivalent % yttrium to about 9.5 equivalent % yttrium, from about 90.5 equivalent % aluminum up to about 97.5 equivalent % aluminum, from greater than about 4.1 equivalent % oxygen to about 8.0 equivalent % oxygen and from about 92.0 equivalent % nitrogen up to about 95.9 equivalent % nitrogen, said polycrystalline body having a porosity of less than about 5% by volume of said body and a thermal conductivity greater than 1.5 W/cm·K E 22° C.

In one embodiment, the present polycrystalline body has a composition defined and encompassed by line ABKA but not including line BK of FIG. 1, a phase composition comprised of AlN, $Y_2O_3$ and YN, a porosity of less than about 10% by volume of the total volume of said body and a thermal conductivity greater than 1.0 W/cm·K at 22° C. Specifically, the present polycrystalline body with a composition defined and encompassed by line ABKA but not including line BK of FIG. 1 has a phase composition comprised of AlN and a total amount of second phases comprised of $Y_2O_3$ and YN ranging from greater than about 7.6% by volume to about 27.3% by volume of the total volume of the sintered body with the $Y_2O_3$ phase being present in an amount of at least about 7.6% by volume of the sintered body.

In another embodiment, the present polycrystalline body has a composition comprised of from greater than about 4.4 equivalent % yttrium to about 19.75 equivalent % yttrium, from about 80.25 equivalent % aluminum up to about 95.6 equivalent % aluminum, from greater than about 4.4 equivalent % oxygen to about 15.25 equivalent % oxygen and from about 84.75 equivalent % nitrogen up to about 95.6 equivalent % nitrogen, said polycrystalline body having a porosity of less than about 10% by volume of said body and a thermal conductivity greater than 1.0 W/cm·K at 22° C.

In another embodiment, the present polycrystalline body has a composition defined by line BK of FIG. 1, a phase composition comprised of AlN and $Y_2O_3$, a porosity of less than about 10% by volume of said body and a thermal conductivity greater than 1.0 W/cm·K at 22° C.

More specifically, the present polycrystalline body having a phase composition defined by line BK of FIG. 1 is comprised of AlN and from about 7.6% by volume to about 24.3% by volume of $Y_2O_3$.

In another embodiment, the present polycrystalline body has a composition comprised of from about 4.4 equivalent % yttrium to about 15.25 equivalent % yttrium, from about 84.75 equivalent % aluminum to about 95.6 equivalent % aluminum, from about 4.4 equivalent % oxygen to about 15.25 equivalent % oxygen and from about 84.75 equivalent % nitrogen to about 95.6 equivalent % nitrogen, said polycrystalline body having a porosity of less than about 10% by volume of said body and a thermal conductivity greater than 1.0 W/cm·K at 22° C.

In yet another embodiment, the present polycrystalline body has a composition defined and encompassed by line BCJKB but not including lines BK and CJ of FIG. 1, a phase composition comprised of AlN, $Y_2O_3$ and $Y_4Al_2O_9$, a porosity of less than about 10% by volume of said body and a thermal conductivity greater than 1.0 W/cm·K at 22° C.

More specifically, in the present sintered body with a composition defined and encompassed by line BCJKB but not including lines BK and CJ of FIG. 1, the total amount of second phases $Y_2O_3$ and $Y_4Al_2O_9$ ranges from greater than about 6.0% by volume up to about 24.3% by volume of the total volume of the sintered body with the $Y_2O_3$ phase ranging from a trace amount up to about 24.3% by volume and the $Y_4Al_2O_9$ phase ranging from a trace amount to about 17.1% by volume of the sintered body. A trace amount herein is less than 1% by volume of said body.

In another embodiment, the present polycrystalline body has a composition comprised of from greater than about 2.5 equivalent % yttrium up to about 15.25 equivalent % yttrium, from greater than about 84.75 equivalent % aluminum up to about 97.5 equivalent % aluminum, from greater than about 4.1 equivalent % oxygen up to about 15.25 equivalent % oxygen and from greater than about 84.75 equivalent % nitrogen up to about 95.9 equivalent % nitrogen, said polycrystalline body having a porosity of less than about 10% by volume of said body and a thermal conductivity greater than 1.0 W/cm·K at 22° X.

In yet another embodiment, the present polycrystalline body has a composition defined by line DJ of FIG. 1, a phase composition comprised of AlN and $Y_4Al_2O_9$, a porosity of less than about 10% by volume of said body and a thermal conductivity greater than 1.0 W/cm·K at 22° C.

More specifically, the present polycrystalline body having a phase composition defined by line DJ of FIG. 1 is comprised of AlN and from about 6.0% by volume to about 12.7% by volume of $Y_4Al_2O_9$.

In yet another embodiment, the present polycrystalline body has a composition comprised of from about 2.5 equivalent % yttrium to about 5.5 equivalent % yttrium, from about 94.5 equivalent % aluminum to about 97.5 equivalent % aluminum, from about 4.1 equivalent % oxygen to about 8.5 equivalent % oxygen and from about 91.5 equivalent % nitrogen to about 95.9 equivalent % nitrogen, said polycrystalline body having a porosity of less than about 10% by volume of said body and a thermal conductivity greater than 1.0 W/cm·K at 22° C.

In yet another embodiment, the present polycrystalline body has a composition defined and encompassed by line DEFJD but not including lines DJ and EF of FIG. 1, a phase composition comprised of AlN, $Y_4Al_2O_9$ and $YAlO_3$, a porosity of less than about 10% by volume of said body and a thermal conductivity greater than 1.0 W/cm·K at 22° C.

More specifically, in the present sintered body with a composition defined and encompassed by line DEFJD but not including lines DJ and EF of FIG. 1, the total amount of second phases and $Y_4Al_2O_9$ and $YAlO_3$ ranges from greater than about 4.2% by volume up to about 13.6% by volume of the total volume of the sintered body with the $Y_4Al_2O_9$ phase ranging from a trace amount to about 12.7% by volume of the total volume of the body and the $YAlO_3$ phase ranging from a trace amount to about 13.6% by volume of the total volume of the polycrystalline body.

In yet another embodiment, the present polycrystalline body has a composition comprised of from greater than about 1.6 equivalent % yttrium up to about 5.5 equivalent % yttrium, from greater than about 94.5 equivalent % aluminum up to about 98.4 equivalent % aluminum, from greater than about 4.0 equivalent % oxygen up to about 11.25 equivalent % oxygen and from greater than about 88.75 equivalent % nitrogen up to about 96.0 equivalent % nitrogen, said polycrystalline body having a porosity of less than about 10% by volume of said body and a thermal conductivity greater than 1.0 W/cm·K at 22° C.

The present invention makes it possible to fabricate complex and/or hollow shaped polycrystalline aluminum nitride ceramic articles directly. Specifically, the present sintered product can be produced in the form of a useful complex shaped article without machining such as an impervious crucible, a thin walled tube, a long rod, a spherical body, a tape or a hollow shaped article. The dimensions of the present sintered product differ from those of the unsintered body, by the extent of shrinkage, i.e. densification, which occurs during sintering.

The present ceramic body has a number of uses. It is especially useful as a substrate for an integrated circuit, particularly as a substrate for a semiconducting Si chip for use in computers. The present ceramic body also is useful as a sheath for temperature sensors and as a component in contact with liquid aluminum at high temperatures.

The invention is further illustrated by the following examples wherein the procedure was as follows, unless otherwise stated:

A standard commercial aluminum nitride powder was used which was 99.8% pure exclusive of oxygen. It had a surface area of 5.25 m2/g. The analysis given by the vendor was as follows:

| SPECIFIC ANALYSIS OR PROPERTY | | | |
|---|---|---|---|
| N = 33% | | | |
| C = 150 ppm | | | |
| SPECTROGRAPHIC ANALYSIS | | | |
| Cu | 0.0005–0.005% | Mn | 0.001% |
| Fe | 0.001–0.01 | Mg | 0.0005–0.005 |
| Si | 0.0005–0.005 | | |

In Examples 1–29 and 31–34, the aluminum nitride powder had a measured oxygen content of 2.2% by weight of the powder. In Example 30, the aluminum nitride powder had a measured oxygen content of 2.0% by weight of the powder.

Prior to use, the AlN powder and all of the yttrium additives were stored in glass bottles in a $N_2$ filled glove box.

YN had a measured oxygen content of 4.2 wt %, i.e. 18.3 equivalent % of oxygen, a specific surface area of 1.12 m2/g and an average equivalent spherical particle size of about 0.91 microns.

Yttrium metal had a specific surface area of 0.23 m²/g and an average equivalent spherical particle size of about 5.8 microns.

$YH_3$ had a particle size which was roughly the same as that of the YN additive.

On the basis of the oxygen content of the sintered samples and on the basis of the measured oxygen content of the YN additive, it was assumed that the Y metal $YH_3$ powder additives had an oxygen content of about 4.2 weight %.

In Table II, for powder mixture (equivalent % 0), i.e. the dried powder mixture, calculations were as follows:

In Examples 1–6, 20–28, 30 and 34, the equivalent % of oxygen in the resulting dried powder mixture was calculated based on the predetermined oxygen contents of the AlN and YN powders in the mixture. In Examples 7 and 29, the calculations were based on the assumption that $YH_3$ and Y, respectively, had the same oxygen content as YN, i.e. 4.2 weight %. In Examples 8–18 and 31–33, the equivalent % of oxygen in the resulting dried powder mixture was calculated on the basis of the oxygen content of $Y_2O_3$ and on the predetermined oxygen contents of the AlN and YN powders in the mixture. In Example 19, the equivalent % of oxygen in the resulting dried powder mixture was calculated on the basis of the oxygen content of the $Al_2O_3$ powder and the predetermined oxygen contents of the AlN and YN powders in the mixture. In Example 30, no additive was used and the 3.44 equivalent % of oxygen given is the oxygen content of the AlN powder.

In Examples 8–18 and 31–33, $Y_2O_3$ was used and in Example 19, $Al_2O_3$ was used to produce a powder mixture with increased oxygen content to produce the present sintered body.

In Table II, in Examples 1, 3, 7, 9, 13, 15, 19, 20, 26, 30 and 34, the pressed unsintered pieces, i.e. compacts, were about 0.4" in diameter and about 0.8" in length, and in the remaining examples in Table II, the compacts were about 0.4" in diameter and about 0.2" in length.

The compacts were heated in the furnace at the rate of about 60° C. per minute.

The sintering atmosphere was at ambient pressure, i.e. atmospheric or about atmospheric pressure.

In all of the examples in Table II, the sintering atmosphere was nitrogen gas except Example 21 where the sintering atmosphere was hydrogen gas.

In Example 29, processing was carried out in air, i.e. the resulting dispersion of Y and AlN powders in heptane was dried in air at room temperature, and the resulting dried powder mixture was die pressed in air.

Measured oxygen content was determined by neutron activation analysis.

Density was determined by weighing the sintered body and measuring its dimensions.

Porosity of the sintered body was determined by knowing the theoretical density of the sintered body on the basis of its composition and comparing that to the density measured using the following equation:

$$\text{porosity} = \left(1 - \frac{\text{measured density}}{\text{theoretical density}}\right) 100\% \quad (15)$$

Phase composition of the sintered body was determined by optical microscopy and X-ray diffraction analysis.

The thermal conductivity of the sintered body was measured by a steady state heat-flow method using a rod-shaped sample ~0.3 cm×0.3 cm×1.6 cm sectioned from the sintered body. This method was originally devised by A. Berget in 1888 and is described in an article by G. A. Slack in the "Encyclopeadic Dictionary of Physics", Ed. by J. Thewlis, Pergamon, Oxford, 1961. In this technique the sample is placed inside a high-vacuum chamber, heat is supplied at one end by an electrical heater, and the temperatures are measured with fine-wire thermocouples. The sample is surrounded by a guard cylinder with a matched temperature gradient. The absolute accuracy is ±5%. As a comparison, the thermal conductivity of an $Al_2O_3$ single crystal was measured with this apparatus to be 0.44 W/cm·K at about 22° C.

After thermal conductivity of the sintered sample was determined, its oxygen content was measured, i.e. oxygen content was measured on the section of the sintered body on which thermal conductivity was measured.

Electrical resistivity was measured on the section of the sintered body on which thermal conductivity was measured. To measure electrical resistivity, a gallium-indium coating was applied to two parallel faces of the sintered sample. The DC electrical resistivity was then measured between these two faces at room temperature which was about 22° C.

EXAMPLE 1

0.381 grams of YN were added to 10.18 grams of aluminum nitride powder and the mixture was vibratory milled 17 hours with aluminum nitride milling media and heptane in a plastic jar at room temperature. The resulting dispersion was poured into a flask and dried at 22° C.-150° C. under a vacuum of roughly 400 microns. After vacuum drying, the flask was back-filled with $N_2$. Thus, during drying the sample was not exposed to oxygen. During milling some of the aluminum nitride grinding media wore off which was determined to be 0.189 grams, so that the resulting dried powder mixture was comprised of 96.45 weight % AlN and 3.55 weight % YN. Based on the predetermined oxygen contents of the AlN and YN powders, it was calculated that the resulting dried powder mixture contained 4.00 equivalent % oxygen.

The flask containing the dried mixture was placed into a $N_2$ filled glove box where a portion of it was placed in a die, removed from the glove box and die pressed at room temperature under a pressure of 5 Kpsi. The die was then placed into the $N_2$ filled glove box where the resulting pellet was removed, placed into a rubber bag, removed from the glove box, isostatically pressed at 48 Kpsi at room temperature, placed back into the glove box and removed from the rubber bag. The resulting compact was inserted in a molybdenum boat in the glove box where it was buried in a powder mixture of the same composition as the pellet. The boat was covered with a molybdenum lid and transferred in a $N_2$ filled flask to a molybdenum heating element furnace where it was heated in an atmosphere of nitrogen at ambient pressure, which was about atmospheric pressure, to 2000° C., held at 2000° C. for 60 minutes, and then furnace-cooled in the nitrogen atmosphere to room temperature.

The resulting sintered body had a density of 3.26 g/cc and a porosity of less than 1% by volume of the total volume of the body.

Measured oxygen content of the sintered body was 2.55 weight %, i.e. % by weight of the body, which was 4.50 equivalent % of oxygen indicating that there was a small amount of oxygen pickup, 0.28 wt %. The equivalent % of nitrogen in the sintered body was 100% −4.50 equivalent % oxygen, i.e. 95.5.

The equivalent % of Y in the sintered body was 1.43 and this was based on the amount of Y and Al present in the powder mixture since there does not appear to be any significant loss of Y in the present process. The equivalent % of Al in the sintered body ws 100−1.43 equivalent % of Y, i.e. 98.57. X-ray diffraction analysis indicated that this sintered body was comprised of AlN phase and $YAlO_3$ phase which is outside the present composition. On the basis of its equivalent composition, it is shown in FIG. 1 to lie just outside line EF. Line EF is outside the present composition since a significantly large number of compositions on line EF would not have a thermal conductivity greater than 1.0 Wcm·K at 22° C. The electrical resistivity of the sintered body at room temperature, i.e. about 22° C., was determined at 100v to be $1.0 \times 10^{11}$ ohm·cm, and at 1000v it was $1.0 \times 10^{11}$ ohm·cm.

This example is illustrated in Table II.

All of the examples in Table II were carried out in substantially the same manner as Example 1 except as shown in Table II and except as noted herein.

The pressing procedure used in Examples 3, 6, 7, 9, 12, 15, 19, 20, 26, 30 and 34 was substantially the same as disclosed in Example 1, i.e., the powder mixture was initially die pressed at room temperature at about 5 Kpsi and the resulting pellet was then isostatically pressed at room temperature at the pressure given in Table I. In the remaining examples, the pressing procedure differed from that disclosed in Example 1 in that no isostatic pressing was used, i.e., the dried particulate mixture was die pressed at room temperature under the given pressure.

TABLE II

| Ex | Sample | Powder Mixture (wt %) | | | | | | Powder Mixture (equivalent % O) | Pressing Pressure to Produce Compact (KPSI) | Sintering | | |
|---|---|---|---|---|---|---|---|---|---|---|---|---|
| | | AlN | YN | Y | $YH_3$ | $Y_2O_3$ | $Al_2O_3$ | | | Temp (°C.) | Time (Min) | Atmosphere |
| 1 | 68A | 96.45 | 3.55 | — | — | — | — | 4.00 | 48 | 2000- | 60- | $N_2$ |
| 2 | 76A | 95.33 | 4.67 | — | — | — | — | 4.07 | 8 | 2025- | 60- | $N_2$ |
| 3 | 76B | " | " | — | — | — | — | 4.07 | 30 | 2020- | 60- | $N_2$ |
| 4 | 76C | " | " | — | — | — | — | 4.07 | 10 | 1875- | 60- | $N_2$ |
| 5 | 73A | 94.18 | 5.82 | — | — | — | — | 4.14 | 10 | 2000- | 60- | $N_2$ |
| 6 | 73B | " | " | — | — | — | — | 4.14 | 50 | 2000- | 60- | $N_2$ |
| 7 | 51A | 93.00 | — | — | 7.00 | — | — | ~4.2 | 50 | 2000- | 60- | $N_2$ |
| 8 | 75A | 90.49 | 7.99 | — | — | 1.52 | — | 4.84 | 10 | 1950- | 60- | $N_2$ |
| 9 | 75B | " | " | — | — | " | — | 4.84 | 30 | 1975- | 60- | $N_2$ |
| 10 | 75C | " | " | — | — | " | — | 4.84 | 10 | 1875- | 60- | $N_2$ |
| 11 | 75D | " | " | — | — | " | — | 4.84 | 10 | 1825- | 60- | $N_2$ |
| 12 | 75F | " | " | — | — | " | — | 4.84 | 30 | 1840- | 60- | $N_2$ |
| 13 | 75F | " | " | — | — | " | — | 4.84 | — | 1860- | 60- | $N_2$ |
| 14 | 72A | 81.00 | 2.96 | — | — | 16.03 | — | 10.40 | 10 | 1950- | 60- | $N_2$ |
| 15 | 72B | " | " | — | — | " | — | 10.40 | 50 | 1950- | 60- | $N_2$ |
| 16 | 72C | " | " | — | — | " | — | 10.40 | 10 | 1875- | 60- | $N_2$ |
| 17 | 72D | " | " | — | — | " | — | 10.40 | 10 | 1800- | 60- | $N_2$ |
| 18 | 79A | 80.63 | 3.02 | — | — | 16.35 | — | 10.55 | 10 | 1840- | 60- | $N_2$ |
| 19 | 70A | 58.16 | 27.34 | — | — | — | 14.49 | 19.75 | 50 | 2000- | 60- | $N_2$ |
| 20 | 48A | 84.95 | 15.05 | — | — | — | — | 4.74 | 55 | 2000- | 90- | $N_2$ |
| 21 | 48B | " | " | — | — | — | — | 4.74 | 10 | 2000- | 60- | $H_2$ |
| 22 | 48C | " | " | — | — | — | — | 4.74 | 10 | 1900- | 60- | $N_2$ |
| 23 | 78A | 85.24 | 14.76 | — | — | — | — | 4.72 | 10 | 1950- | 60- | $N_2$ |
| 24 | 78B | " | " | — | — | — | — | 4.72 | 10 | 1975- | 60- | $N_2$ |
| 25 | 69A | 62.29 | 37.71 | — | — | — | — | 6.60 | 10 | 2050- | 60- | $N_2$ |
| 26 | 69B | " | " | — | — | — | — | 6.60 | 46 | 2050- | 60- | $N_2$ |
| 27 | 69C | " | " | — | — | — | — | 6.60 | 10 | 1950- | 60- | $N_2$ |
| 28 | 69D | " | " | — | — | — | — | 6.60 | 10 | 1900- | 60- | $N_2$ |
| 29 | 77A | 89.04 | — | 10.76 | — | — | — | ~4.4 | 10 | 2025- | 60- | $N_2$ |

TABLE II-continued

| Ex | Sample | | | | | | | Density (g/cc) | Porosity (% by vol) | Weight Loss (%) | | | |
|---|---|---|---|---|---|---|---|---|---|---|---|---|---|
| 30 | 40 | 100 | — | — | — | — | — | 3.44 | 50 | 1975- | 60- | $N_2$ | |
| 31 | 80A | 67.42 | 11.52 | — | — | 21.06 | — | 13.94 | 10 | 1900- | 60- | $N_2$ | |
| 32 | 80B | " | " | — | — | " | — | 13.94 | 10 | 1950- | 60- | $N_2$ | |
| 33 | 80C | " | " | — | — | " | — | 13.94 | 10 | 1965- | 60- | $N_2$ | |
| 34 | 81A | 84.49 | 15.51 | — | — | — | — | 4.77 | 30 | 1970- | 60- | $N_2$ | |

| | | Properties of Sintered Body | | | | | | | | |
|---|---|---|---|---|---|---|---|---|---|---|
| | | Measured Oxygen Content | Equivalent % | | Density | Porosity (% by | Weight Loss | | Thermal Conductivity W/cm · | DC Electrical Resistivity Ω-cm @ 22° C. | |
| Ex | Sample | (Wt %) | Oxygen | Yttrium | (g/cc) | vol) | (%) | Second Phases | K @ 22° C. | (100 v) | (1000 v) |
| 1 | 68A | 2.55 | 4.50 | 1.43 | 3.26 | <1 | — | $YAlO_3$ | 1.17 | $1.0 \times 10^{11}$ | $1.0 \times 10^{11}$ |
| 2 | 76A | — | ~4.45* | 1.90 | 3.26 | <1 | — | $Y_4Al_2O_9$, $YAlO_3$ | — | — | — |
| 3 | 76B | — | ~4.45* | 1.90 | 3.29 | <1 | 2.6 | $YAlO_3$ | 1.37 | $2.3 \times 10^{11}$ | $2.2 \times 10^{11}$ |
| 4 | 76C | — | ~4.45* | 1.90 | 3.40 | <1 | 2.0 | $Y_4Al_2O_9$, $YAlO_3$ | — | — | — |
| 5 | 73A | — | 4.53 | 2.38 | 3.38 | <1 | — | $Y_4Al_2O_9$, $YAlO_3$ | — | — | — |
| 6 | 73B | 2.54 | 4.53 | 2.38 | 3.37 | <1 | — | $Y_4Al_2O_9$ | — | — | — |
| 7 | 51A | 2.85 | 5.16 | ~3.1 | 3.38 | <1 | — | $Y_2O_3$, $Y_4Al_2O_9$ | 1.74 | $4.6 \times 10^{13}$ | $3.8 \times 10^{13}$ |
| 8 | 75A | — | 5.22 | 3.94 | 3.32 | <1 | — | $Y_2O_3$, $Y_4Al_2O_9$ | — | — | — |
| 9 | 75B | 2.85 | 5.22 | 3.94 | 3.38 | <1 | — | $Y_2O_3$, $Y_4Al_2O_9$ | 1.71 | $3.3 \times 10^{13}$ | $2.8 \times 10^{13}$ |
| 10 | 75C | — | 5.22 | 3.94 | 3.47 | <1 | 1.0 | $Y_2O_3$, $Y_4Al_2O_9$ | — | — | — |
| 11 | 75D | — | 5.22 | 3.94 | 3.11 | ~8 | 1.6 | $Y_2O_3$, $Y_4Al_2O_9$ | — | — | — |
| 12 | 75F | — | 5.22 | 3.94 | 3.15 | ~7 | — | — | — | — | — |
| 13 | 75F | — | 5.22 | 3.94 | 3.38 | <1 | — | — | 1.66 | $1.9 \times 10^{11}$ | $1.3 \times 10^{11}$ |
| 14 | 72A | — | ~10.83* | 8.00 | 3.56 | <1 | — | $Y_2O_3$, $Y_4Al_2O_9$ | — | — | — |
| 15 | 72B | — | ~10.83* | 8.00 | 3.28 | — | — | — | — | — | — |
| 16 | 72C | — | ~10.83* | 8.00 | 3.55 | <1 | — | $Y_2O_3$, $Y_4Al_2O_9$ | — | — | — |
| 17 | 72D | — | ~10.83* | 8.00 | 2.57 | ~28 | — | $Y_2O_3$, $Y_4Al_2O_9$ | — | — | — |
| 18 | 79A | — | ~10.99* | 8.18 | 3.47 | ~2.5 | — | — | — | — | — |
| 19 | 70A | — | ~20.23* | 13.38 | — | — | — | $Y_2O_3$, $Y_4Al_2O_9$ | — | — | — |
| 20 | 48A | 2.62 | 4.97 | 6.54 | 3.48 | <1 | — | YN, $Y_2O_3$ | 1.72 | $1.4 \times 10^{13}$ | $5.4 \times 10^{12}$ |
| 21 | 48B | — | 4.97 | 6.54 | 3.35 | <1 | — | YN, $Y_2O_3$ | — | — | — |
| 22 | 48C | — | 4.97 | 6.54 | 2.41 | ~28 | 1.9 | YN, $Y_2O_3$ | — | — | — |
| 23 | 78A | — | ~5.00* | 6.40 | 2.78 | ~20 | — | — | — | — | — |
| 24 | 78B | — | ~5.00* | 6.40 | 3.55 | <1 | — | — | — | — | — |
| 25 | 69A | — | 7.16 | 19.30 | 3.86 | <1 | — | YN, $Y_2O_3$ | — | — | — |
| 26 | 69B | 3.21 | 7.16 | 19.30 | 3.85 | <1 | — | — | 1.18 | $1.7 \times 10^{13}$ | $1.1 \times 10^{13}$ |
| 27 | 69C | — | 7.16 | 19.30 | 3.99 | <1 | — | — | — | — | — |
| 28 | 69D | — | 7.16 | 19.30 | 3.33 | ~15 | 1.6 | YN, $Y_2O_3$ | — | — | — |
| 29 | 77A | 2.93 | 5.46 | ~5.2 | 3.51 | <1 | 0.8 | YN, $Y_2O_3$ | — | — | — |
| 30 | 40 | 1.88 | 3.24 | 0 | 3.11 | 5 | 2.9 | $Al_{10}N_8O_3$ | 0.41 | — | — |
| 31 | 80A | — | ~14.42* | 15.39 | 2.52 | ~33 | — | — | — | — | — |
| 32 | 80B | — | ~14.42* | 15.39 | 3.43 | ~10 | — | — | — | — | — |
| 33 | 80C | — | ~14.42* | 15.39 | 3.79 | <1 | — | $Y_2O_3$, YN | — | — | — |
| 34 | 81A | — | ~5.19* | 6.76 | 3.57 | <1 | — | — | 1.68 | — | — |

*Assumes sample picked up 0.216 wt % oxygen during processing.

The measured oxygen contents of the sintered bodies of Examples 1, 6, 7, 9, 20, 26, 29, and 30 indicate that, except for Example 30, the sintered bodies contained slightly more oxygen, i.e., about 0.12 wt % to about 0.28 wt %, than the oxygen content of the starting powder mixture. Presumably, the powder and samples picked up a small amount of oxygen during processing.

In Table II, the equivalent % composition of the sintered body was calculated from the starting powder composition and from the given measured oxygen content of the sintered body except in Examples 2-4, 14-19, 23-24 and 31-34 where an oxygen pickup of 0.216 wt % was assumed. Also, since their starting batch powder mixture was the same, it was assumed that the measured oxygen content of the sintered body of Example 6 was the same in Example 5, that the measured oxygen content of the sintered body of Example 9 was the same in Examples 8 and 10-13, that the measured oxygen content of Example 20 was the same in Examples 21 and 22, and that the measured oxygen content of Example 26 was the same in Examples 25, 27 and 28. The Y, Al, N and oxygen are assumed to have their conventional valences of: +3, +3, −3, −2, respectively.

The small amount of oxygen pickup is assumed to have occurred by the overall reaction:

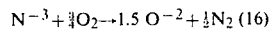

$$N^{-3} + \tfrac{3}{2}O_2 \rightarrow 1.5\ O^{-2} + \tfrac{1}{2}N_2 \quad (16)$$

where, to maintain charge neutrality, one nitrogen atom is replaced by 1½ oxygen atoms.

In the sintered bodies, the amount of Y and Al is assumed to be the same as that in the starting powder. The oxygen content is assumed to be that measured.

The N content is determined by assuming that the initial N content has been slightly reduced, due to replacement by the small amount of additional oxygen, as given by equation (16).

I.e., the oxygen increase is measured, and it is assumed that each additional 3 oxygen atoms have replaced 2 nitrogen atoms. The oxygen and nitrogen contents in the sintered bodies are only slightly different than those in the starting powder.

In Table II from the measured oxygen contents, it was determined that the sintered body contained on the average 0.22 weight percent more oxygen than in the starting mixture. This would be equivalent to a loss of about 0.13 weight % nitrogen according to equation (16).

In Table II, Examples 2, 4-10, 13, 14, 16, 20, 21, 24-27, 29, 33 and 34 illustrate the present invention, and the present sintered bodies produced in these examples would be useful as a supporting substrate, i.e. heat sink, for a semiconductor such as, for example, a silicon chip. Also, the present sintered bodies produced in these examples had a phase composition comprised of AlN and less than 28% by volume of the body of the given second phase or phases. Also, X-ray diffraction analysis indicated that Example 7 contained ~3.6 equivalent % yttrium and that Example 29 contained ~6 equivalent % yttrium.

Specifically, in Examples 2 and 4, a sintered body of the present composition was produced which fell in Region V and which, based on other experiments, would necessarily have a thermal conductivity greater than 1.0 W/cm·K @22° C.

Although the starting composition in Example 3 was the same as that in Examples 2 and 4, it apparently picked up slightly more oxygen during processing so that the composition of the resulting sintered body fell on line EF of FIG. 1 which is outside the present invention.

Although Examples 5 and 6 had the same starting composition, X-ray diffraction analysis of the sintered body of Example 5 showed that it fell in Region V of the present composition in FIG. 1 whereas the measured oxygen content and X-ray diffraction analysis of the sintered body of Example 6 showed that it fell in Region IV of the present composition in FIG. 1. These data indicate that the sample of Example 5 picked up slightly more oxygen during processing than the sample of Example 6. Based on other experiments, the sintered bodies of Examples 5 and 6 would necessarily have a thermal conductivity greater than 1.0 W/cm·K @22° C.

In Example 7, the sintered body fell in Region III of the present composition in FIG. 1.

In Examples 8-12, the starting compositions were the same, and in Example 13, the sintered body of Example 12 was resintered and such resintering decreased its porosity to less than 1%. The compositions of the sintered bodies of Examples 8-13 fall in Region III of the present composition in FIG. 1. The thermal conductivities of the sintered bodies of Examples 9 and 13 indicate that the thermal conductivities of the sintered bodies of Examples 8 and 10 would have a thermal conductivity greater than 1.0 W/cm·K @ 22° C. In Examples 11 and 12 the sintering temperature was too low.

The sintered body of Examples 14 and 16 had a composition falling in Region III of the present composition in FIG. 1, and based on other experiments, each of these sintered bodies would necessarily have a thermal conductivity greater than 1.0 W/cm·K @22° C.

In Example 15, the sintered body was found to contain internal voids apparently caused by too much liquid phase generated for the particular size of this sample.

In Example 17, the sintered product had an excessively high porosity because the sintering temperature was too low.

In Example 18, the sintering temperature was too low.

In Example 19, the sintered product had a composition which was outside the present composition.

In Examples 20 and 21, the composition of the sintered body fell in Region I of the present composition in FIG. 1, and based on Example 20, the sintered body of Example 21 would necessarily have a thermal conductivity greater than 1.0 W/cm·K @22° C.

In Example 22, the sintered product was excessively porous because the sintering temperature of 1900° C. was too low for Region I.

In Example 23, the sintered product was excessively porous because the sintering temperature of 1950° C. was too low for this particular composition which fell in the preferred portion of Region I of the present composition in FIG. 1.

In Example 24, the composition of the sintered body fell in the preferred portion of the present composition in FIG. 1, and based on other experiments, it would necessarily have a thermal conductivity greater than 1.0 W/cm·K @22° C.

In Examples 25-27, the composition of the sintered bodies fell in Region I of the present composition in FIG. 1, and based on other experiments as well as on the measured thermal conductivity of the sintered body of Examples 26, the sintered bodies of Examples 25 and 27 would necessarily have a thermal conductivity greater than 1.0 W/cm·K @22° C.

In Example 28, the sintered product was excessively porous because the sintering temperature of 1900° C. was too low for this Region I composition.

The composition of the sintered body of Example 29 fell in Region I of the present composition in FIG. 1, and based on the other experiments, it would necessarily have a thermal conductivity greater than 1.0 W/cm·K at 22° C.

No yttrium additive was used in Example 30. A comparison of the thermal conductivity of the sintered body of Example 30 with those of the present invention illustrates the significant improvement in thermal conductivity produced by the present invention.

A comparison of Examples 31-33 shows that they have the same starting Region I composition and that a sintering temperature higher than about 1950° C. for such composition was necessary to produce the present sintered product.

The sintered body of Example 33 fell in Region I of the present composition in FIG. 1, and based on other experiments, it would necessarily have a thermal conductivity greater than 1.0 W/cm·K @22° C.

The composition of the sintered body of Example 34 fell in Region I of the present composition in FIG. 1.

EXAMPLE 35

In this example, indication is given of the extent to which a powder picks up oxygen from air. In Table III, each powder was at room temperature in a small vial open at one end to air for the given time period, and the increase in weight of the powder at the end of the given time period is given as weight %.

TABLE III

| Powder | Weight Gain | | |
|---|---|---|---|
| | 1 hour (wt %) | 10 hours (wt %) | 80 hours (wt %) |
| AlN | .047 | .094 | 0.15 |
| −40 mesh Y | .19 | .40 | .61 |
| −270 mesh Y | .31 | .53 | .64 |
| −60 mesh YN | .09 | 2.7 | 8.1 |
| −60 + 270 mesh YH$_3$ | .11 | 10.5 | 12.9 |

The weight % increase shown by Table III is assumed to be due to oxidation of the powder.

In copending U.S. patent application Ser. No. 519,158, now U.S. Pat. No. 4,478,785, entitled HIGH THERMAL CONDUCTIVITY ALUMINUM NITRIDE CERAMIC BODY, filed on Aug. 1, 1983, in the names of Irvin Charles Huseby and Carl Francis Bobik and assigned to the assignee hereof and incorporated herein by reference, there is disclosed the process comprising forming a mixture comprised of aluminum nitride powder and free carbon wherein the aluminum nitride has a predetermined oxygen content higher than about 0.8% by weight and wherein the amount of free carbon reacts with such oxygen content to produce a deoxidized powder or compact having an oxygen content ranging from greater than about 0.35% by weight to about 1.1% by weight and which is at least 20% by weight lower than the predetermined oxygen content, heating the mixture or a compact thereof to react the carbon and oxygen producing the deoxidized aluminum nitride, and sintering a compact of the deoxidized aluminum nitride producing a ceramic body having a density greater than 85% of theoretical and a thermal conductivity greater than 0.5 W/cm·K at 22° C.

What is claimed is:

1. A process for producing a polycrystalline body comprised of a composition defined and encompassed by line ABCDEFA but not including lines CD and EF of FIG. 1, a porosity of less than about 5% by volume of said body and a thermal conductivity greater than 1.0 W/cm·K at 22° C. which comprises forming a mixture comprised of aluminum nitride powder and an yttrium additive selected from the group consisting of yttrium, yttrium hydride, yttrium nitride and mixtures thereof, said aluminum nitride and yttrium additive containing oxygen, shaping said mixture into a compact, said mixture and said compact being comprised of a composition wherein the equivalent % of yttrium, aluminum, nitrogen and oxygen is defined and encompassed by line ABCDEFA but not including lines CD and EF in FIG. 1, said mixture, said compact and said polycrystalline body being comprised of from greater than about 1.6 equivalent % yttrium to about 19.75 equivalent % yttrium, from about 80.25 equivalent % aluminum up to about 98.4 equivalent % aluminum, from greater than about 4.0 equivalent % oxygen to about 15.25 equivalent % oxygen and from about 84.75 equivalent % nitrogen up to about 96 equivalent % nitrogen, and sintering said compact at a temperature ranging from about 1850° C. to about 2170° C. in an atmosphere at ambient pressure selected from the group consisting of nitrogen, argon, hydrogen and mixtures thereof to produce said polycrystalline body, said compact containing sufficient equivalent percent of yttrium and oxygen to form a sufficient amount of liquid phase at sintering temperature to densify the compact to produce said polycrystalline body, said sintering temperature being a sintering temperature for said compact.

2. The process according to claim 1 wherein said yttrium additive is yttrium.

3. The process according to claim 1 wherein said yttrium additive is yttrium nitride.

4. The process according to claim 1 wherein said compact and said polycrystalline body are comprised of a composition defined and encompassed by line ABKA but not including line BK in FIG. 1, said compact and said polycrystalline body are comprised of from greater than about 4.4 equivalent % yttrium to about 19.75 equivalent % yttrium, from about 80.25 equivalent % aluminum up to about 95.6 equivalent % aluminum, from greater than about 4.4 equivalent % oxygen to about 15.25 equivalent % oxygen and from about 84.75 equivalent % nitrogen up to about 95.6 equivalent % nitrogen, and said sintering temperature ranges from about 1940° C. to about 2050° C.

5. The process according to claim 1 wherein said compact and said polycrystalline body are comprised of a composition defined by line BK of FIG. 1, said compact and said polycrystalline body are comprised of from about 4.4 equivalent % yttrium to about 15.25 equivalent % yttrium, from about 84.75 equivalent % aluminum to about 95.6 equivalent % aluminum, from about 4.4 equivalent % oxygen to about 15.25 equivalent % oxygen and from about 84.75 equivalent % nitrogen to about 95.6 equivalent % nitrogen, and said sintering temperature ranges from about 1940° C. to about 2150° C.

6. The process according to claim 1 wherein said compact and said polycrystalline body are comprised of a composition defined and encompassed by line BCJKB but not including lines BK and CJ of FIG. 1, said compact and said polycrystalline body are comprised of from greater than about 2.5 equivalent % yttrium up to about 15.25 equivalent % yttrium, from greater than about 84.75 equivalent % aluminum up to about 97.5 equivalent % aluminum, from greater than about 4.1 equivalent % oxygen up to about 15.25 equivalent % oxygen and from greater than about 84.75 equivalent % nitrogen up to about 95.9 equivalent % nitrogen, and said sintering temperature ranges from about 1860° C. to about 2080° C.

7. The process according to claim 1 wherein said compact and said polycrystalline body are comprised of a composition defined by line DJ of FIG. 1, said compact and said polycrystalline body are comprised of from about 2.5 equivalent % yttrium to about 5.5 equivalent % yttrium, from about 94.5 equivalent % aluminum to about 97.5 equivalent % aluminum, from about 4.1 equivalent % oxygen to about 8.5 equivalent % oxygen and from about 91.5 equivalent % nitrogen to about 95.9 equivalent % nitrogen, and said sintering temperature ranges from about 1850° C. to about 2070° C.

8. The process according to claim 1 wherein said compact and said polycrystalline body are comprised of a composition defined and encompassed by line DEFJD but not including lines DJ and EF of FIG. 1, said compact and said polycrystalline body are comprised of from greater than about 1.6 equivalent % yttrium up to about 5.5 equivalent % yttrium, from greater than about 94.5 equivalent % aluminum up to about 98.4 equivalent % aluminum, from greater than about 4.0 equivalent % oxygen up to about 11.25 equivalent % oxygen and from greater than about 88.75 equivalent % nitrogen up to about 96 equivalent % nitrogen, and said sintering temperature ranges from about 1850° C. to about 2050° C.

9. A process for producing a polycrystalline aluminum nitride ceramic body comprised of a composition defined and encompassed by line GHIJG but not including line IJ of FIG. 1, a porosity of less than about 5% by volume of said body and a thermal conductivity greater than 1.0 W/cm·K at 22° C. which comprises forming a mixture comprised of aluminum nitride powder and an yttrium additive selected from the group consisting of yttrium, yttrium hydride, yttrium nitride and mixtures thereof, said aluminum nitride and yttrium additive containing oxygen, shaping said mixture into a compact, said mixture and said compact having a composition wherein the equivalent % of yttrium, aluminum, nitrogen and oxygen is defined and encompassed by line GHIJG but not including line IJ in FIG. 1, said mixture, said compact and said polycrystalline body having a composition comprised of from greater than about 2.5 equivalent % yttrium to about 9.5 equivalent % yttrium, from about 90.5 equivalent % aluminum up to about 97.5 equivalent % aluminum, from greater than about 4.1 equivalent % oxygen to about 8.0 equivalent % oxygen and from about 92.0 equivalent % nitrogen up to about 95.9 equivalent % nitrogen, and sintering said compact at a temperature ranging from about 1860° C. to about 2170° C. in an atmosphere at ambient pressure selected from the group consisting of nitrogen, argon, hydrogen and mixtures thereof to produce said polycrystalline body, said compact containing sufficient equivalent percent of yttrium and oxygen to form a sufficient amount of liquid phase at said sintering temperature to densify said compact to produce said polycrystalline body.

10. A polycrystalline aluminum nitride body comprised of a composition defined and encompassed by line ABCDEFA but not including lines CD and EF of FIG. 1, said polycrystalline body being comprised of from greater than about 1.6 equivalent % yttrium to about 19.75 equivalent % yttrium, from about 80.25 equivalent % aluminum up to about 98.4 equivalent % aluminum, from greater than about 4.0 equivalent % oxygen to about 15.25 equivalent % oxygen and from about 84.75 equivalent % nitrogen up to about 96 equivalent % nitrogen, said polycrystalline body having a porosity of less than about 5% by volume of said body and a thermal conductivity greater than 1.0 W/cm·K at 22° C.

11. The polycrystalline aluminum nitride body according to claim 10 wherein said body has a porosity of less than about 2% by volume of said body.

12. The polycrystalline aluminum nitride body according to claim 10 wherein said body is a liquid phase sintered body.

13. A polycrystalline aluminum nitride body comprised of a composition defined and encompassed by line ABKA but not including line BK of FIG. 1, said polycrystalline body being comprised of from greater than about 4.4 equivalent % yttrium to about 19.75 equivalent % yttrium, from about 80.25 equivalent % aluminum up to about 95.6 equivalent % aluminum, from greater than about 4.4 equivalent % oxygen to about 15.25 equivalent % oxygen and from about 84.75 equivalent % nitrogen up to about 95.6 equivalent % nitrogen, said polycrystalline body having a phase composition comprised of AlN, $Y_2O_3$ and YN, a porosity of less than about 5% by volume of said body and a thermal conductivity greater than 1.0 W/cm·K at 22° C.

14. The polycrystalline aluminum nitride body according to claim 13 wherein said body has a porosity of less than about 2% by volume of said body.

15. The polycrystalline aluminum nitride body according to claim 13 wherein said body is a liquid phase sintered body.

16. A polycrystalline aluminum nitride body comprised of a composition defined by line BK of FIG. 1, said polycrystalline body being comprised of from about 4.4 equivalent % yttrium to about 15.25 equivalent % yttrium, from about 84.75 equivalent % aluminum to about 95.6 equivalent % aluminum, from about 4.4 equivalent % oxygen to about 15.25 equivalent % oxygen and from about 84.75 equivalent % nitrogen to about 95.6 equivalent % nitrogen, said polycrystalline body having a phase composition comprised of AlN and $Y_2O_3$, a porosity of less than about 5% by volume of said body and a thermal conductivity greater than 1.0 W/cm·K at 22° C.

17. The polycrystalline aluminum nitride body according to claim 16 wherein said body has a porosity of less than about 2% by volume of said body.

18. The polycrystalline aluminum nitride body according to claim 16 wherein said body is a liquid phase sintered body.

19. A polycrystalline aluminum nitride body comprised of a composition defined and encompassed by line BCJKB but not including lines BK and CJ of FIG. 1, said polycrystalline body being comprised of from greater than about 2.5 equivalent % yttrium up to about 15.25 equivalent % yttrium, from greater than about 84.75 equivalent % aluminum up to about 97.5 equivalent % aluminum, from greater than about 4.1 equivalent % oxygen up to about 15.25 equivalent % oxygen and from greater than about 84.75 equivalent % nitrogen up to about 95.9 equivalent % nitrogen, said polycrystalline body having a phase composition comprised of AlN, $Y_2O_3$ and $Y_4Al_2O_9$, a porosity of less than about 5% by volume of said body and a thermal conductivity greater than 1.0 W/cm·K at 22° C.

20. The polycrystalline aluminum nitride body according to claim 19 wherein said body has a porosity of less than about 2% by volume of said body.

21. The polycrystalline aluminum nitride body according to claim 19 wherein said body is a liquid phase sintered body.

22. A polycrystalline aluminum nitride body comprised of a composition defined by line DJ of FIG. 1, said polycrystalline body being comprised of from about 2.5 equivalent % yttrium to about 5.5 equivalent % yttrium, from about 94.5 equivalent % aluminum to about 97.5 equivalent % aluminum, from about 4.1 equivalent % oxygen to about 8.5 equivalent % oxygen and from about 91.5 equivalent % nitrogen to about 95.9 equivalent % nitrogen, said polycrystalline body having a phase composition comprised of AlN and $Y_4Al_2O_9$, a porosity of less than about 5% by volume of said body and a thermal conductivity greater than 1.0 W/cm·K at 22° C.

23. The polycrystalline aluminum nitride body according to claim 22 wherein said body has a porosity of less than about 2% by volume of said body.

24. The polycrystalline aluminum nitride body according to claim 22 wherein said body is a liquid phase sintered body.

25. A polycrystalline aluminum nitride body comprised of a composition defined and encompassed by line DEFJD but not including lines DJ and EF of FIG. 1, said polycrystalline body being comprised of from greater than about 1.6 equivalent % yttrium up to about 5.5 equivalent % yttrium, from greater than about 94.5 equivalent % aluminum up to about 98.4 equivalent % aluminum, from greater than about 4.0 equivalent % oxygen up to about 11.25 equivalent % oxygen and from greater than about 88.75 equivalent % nitrogen up to about 96 equivalent % nitrogen, said polycrystalline body having a phase composition comprised of AlN, $Y_4Al_2O_9$ and $YAlO_3$, a porosity of less than about 5% by volume of said body and a thermal conductivity greater than 1.0 W/cm·K at 22° C.

26. The polycrystalline aluminum nitride body according to claim 25 wherein said body has a porosity of less than about 2% by volume of said body.

27. The polycrystalline aluminum nitride body according to claim 25 wherein said body is a liquid phase sintered body.

28. A polycrystalline aluminum nitride body comprised of a composition defined and encompassed by line GHIJG but not including line IJ of FIG. 1, said polycrystalline body being comprised of from greater than about 2.5 equivalent % yttrium to about 9.5 equivalent % yttrium, from about 90.5 equivalent % aluminum up to about 97.5 equivalent % aluminum, from greater than about 4.1 equivalent % oxygen to about 8.0 equivalent % oxygen and from about 92.0 equivalent % nitrogen up to about 95.9 equivalent % nitrogen, said polycrystalline body having a porosity of less than about 5% by volume of said body and a thermal conductivity greater than 1.0 W/cm·K at 22° C.

29. The polycrystalline aluminum nitride body according to claim 28 wherein said body has a porosity of less than about 2% by volume of said body and a thermal conductivity greater than 1.5 W/cm·K at 22° C.

30. The polycrystalline aluminum nitride body according to claim 28 wherein said body is a liquid phase sintered body.

31. A polycrystalline body having a phase composition comprised of AlN and a second phase wherein the total amount of said second phase ranges from greater than about 4.2% by volume to about 27.3% by volume of the total volume of said body, said second phase being selected from the group consisting of $Y_2O_3$, $Y_4Al_2O_9$, a mixture of $Y_2O_3$ and YN, a mixture of $Y_2O_3$ and $Y_4Al_2O_9$ and a mixture of $Y_4Al_2O_9$ and $YAlO_3$, said polycrystalline body being comprised of from greater than about 1.6 equivalent % yttrium to about 19.75 equivalent % yttrium, from about 80.25 equivalent % aluminum up to about 98.4 equivalent % aluminum, from greater than about 4.0 equivalent % oxygen to about 15.25 equivalent % oxygen and from about 84.75 equivalent % nitrogen up to about 96 equivalent % nitrogen, said body having a porosity of less than about 5% by volume of said body and a thermal conductivity greater than 1.0 W/cm·K at 22° C.

32. The polycrystalline aluminum nitride body according to claim 31 wherein said body has a porosity of less than about 2% by volume of said body.

33. The polycrystalline aluminum nitride body according to claim 31 wherein said body is a liquid phase sintered body.

34. A polycrystalline body having a phase composition comprised of AlN, and a mixture of $Y_2O_3$, and YN wherein the total amount of said mixture of $Y_2O_3$ and YN phases ranges from greater than about 7.6% by volume to about 27.3% by volume of the total volume of said body, said $Y_2O_3$ phase being present in an amount of at least about 7.6% by volume of said sintered body, said body having a porosity of less than about 5% by volume of said body and a thermal conductivity greater than 1.0 W/cm·K at 22° C.

35. The polycrystalline aluminum nitride body according to claim 34 wherein said body has a porosity of less than about 2% by volume of said body.

36. The polycrystalline aluminum nitride body according to claim 34 wherein said body is a liquid phase sintered body.

37. A polycrystalline body having a phase composition comprised of AlN and $Y_2O_3$ wherein the total amount of said $Y_2O_3$ phase ranges from about 7.6% by volume to about 24.3% by volume of the total volume of said body, said body having a porosity of less than about 5% by volume of said body and a thermal conductivity greater than 1.0 W/cm·K at 22° C.

38. The polycrystalline aluminum nitride body according to claim 31 wherein said body has a porosity of less than about 2% by volume of said body.

39. The polycrystalline aluminum nitride body according to claim 37 wherein said body is a liquid phase sintered body.

40. A polycrystalline body having a phase composition comprised of AlN and a mixture of $Y_2O_3$ and $Y_4Al_2O_9$ wherein the total amount of said mixture of $Y_2O_3$ and $Y_4Al_2O_9$ phases ranges from greater than about 6.0% by volume up to about 24.3% by volume of the total volume of said body, said $Y_2O_3$ phase ranging from a trace amount up to about 24.3% by volume of said body, and said $Y_4Al_2O_9$ phase ranging from a trace amount to about 17.1% by volume of said sintered body, said body having a porosity of less than about 5% by volume of said body and a thermal conductivity greater than 1.0 W/cm·K at 22° C.

41. The polycrystalline aluminum nitride body according to claim 40 wherein said body has a porosity of less than about 2% by volume of said body.

42. The polycrystalline aluminum nitride body according to claim 40 wherein said body is a liquid phase sintered body.

43. A polycrystalline body having a phase composition comprised of AlN and $Y_4Al_2O_9$ wherein the total amount of said $Y_4Al_2O_9$ phase ranges from about 6.0% by volume to about 12.7% by volume of the total volume of said body, said body having a porosity of less than about 5% by volume of said body and a thermal conductivity greater than 1.0 W/cm·K at 22° C.

44. The polycrystalline aluminum nitride body according to claim 43 wherein said body has a porosity of less than about 2% by volume of said body.

45. The polycrystalline aluminum nitride body according to claim 43 wherein said body is a liquid phase sintered body.

46. A polycrystalline body having a phase composition comprised of AlN and a mixture of $Y_4Al_2O_9$ and $YAlO_3$ wherein the total amount of said mixture of $Y_4Al_2O_9$ and $YAlO_3$ phases ranges from greater than about 4.2% by volume up to about 13.6% by volume of the total volume of said body, said $Y_4Al_2O_9$ phase ranging from a trace amount to about 12.7% by volume of the total volume of said body, and said $YAlO_3$ phase ranging from a trace amount up to about 13.6% by volume of the total volume of said body, said body having a porosity of less than about 5% by volume of said body and a thermal conductivity greater than 1.0 W/cm·K at 22° C.

47. The polycrystalline aluminum nitride body according to claim 46 wherein said body has a porosity of less than about 2% by volume of said body.

48. The polycrystalline aluminum nitride body according to claim 46 wherein said body is a liquid phase sintered body.

49. A polycrystalline aluminum nitride body comprised of a composition defined by line DJ of FIG. 1, said polycrystalline body being comprised of from about 2.5 equivalent % yttrium to about 5.5 equivalent % yttrium, from about 94.5 equivalent % aluminum to about 97.5 equivalent % aluminum, from about 4.1 equivalent % oxygen to about 8.5 equivalent % oxygen and from about 91.5 equivalent % nitrogen to about 95.9 equivalent % nitrogen, said polycrystalline body having a phase composition comprised of AlN and $Y_4Al_2O_9$, a porosity of less than about 10% by volume of said body and a thermal conductivity greater than 1.0 W/cm·K at 22° C.

50. A polycrystalline aluminum nitride body comprised of a composition defined and encompassed by line DEFJD but not including lines DJ and EF of FIG. 1, said polycrystalline body being comprised of from greater than about 1.6 equivalent % yttrium up to about 5.5 equivalent % yttrium, from greater than about 94.5 equivalent % aluminum up to about 98.4 equivalent % aluminum, from greater than about 4.0 equivalent % oxygen up to about 11.25 equivalent % oxygen and from greater than about 88.75 equivalent % nitrogen up to about 96 equivalent % nitrogen, said polycrystalline body having a phase composition comprised of AlN, $Y_4Al_2O_9$ and $YAlO_3$, a porosity of less than about 10% by volume of said body and a thermal conductivity greater than 1.0 W/cm·K at 22° C.

51. A polycrystalline aluminum nitride body comprised of a composition defined and encompassed by line GHIJG but not including line IJ of FIG. 1, said polycrystalline body being comprised of from greater than about 2.5 equivalent % yttrium to about 9.5 equivalent % yttrium, from about 90.5 equivalent % aluminum up to about 97.5 equivalent % aluminum, from greater than about 4.1 equivalent % oxygen to about 8.0 equivalent % oxygen and from about 92.0 equivalent % nitrogen up to about 95.9 equivalent % nitrogen, said polycrystalline body having a porosity of less than about 10% by volume of said body and a thermal conductivity greater than 1.0 W/cm·K at 22° C.

52. A polycrystalline body having a phase composition comprised of AlN and $Y_4Al_2O_9$ wherein the total amount of said $Y_4Al_2O_9$ phase ranges from about 6.0% by volume to about 12.7% by volume of the total volume of said body, said body having a porosity of less than about 10% by volume of said body and a thermal conductivity greater than 1.0 W/cm·K at 22° C.

53. A polycrystalline body having a phase composition comprised of AlN and a mixture of $Y_4Al_2O_9$ and $YAlO_3$ wherein the total amount of said mixture of $Y_4Al_2O_9$ and $YAlO_3$ phases ranges from greater than about 4.2% by volume up to about 13.6% by volume of the total volume of said body, said $Y_4Al_2O_9$ phase ranging from a trace amount to about 12.7% by volume of the total volume of said body, and said $YAlO_3$ phase ranging from a trace amount up to about 13.6% by volume of the total volume of said body, said body having a porosity of less than about 10% by volume of said body and a thermal conductivity greater than 1.0 W/cm·K at 22° C.

* * * * *